June 26, 1928.
P. J. SHRUM
THREAD PROTECTOR
1,675,143
Original Filed April 22, 1924
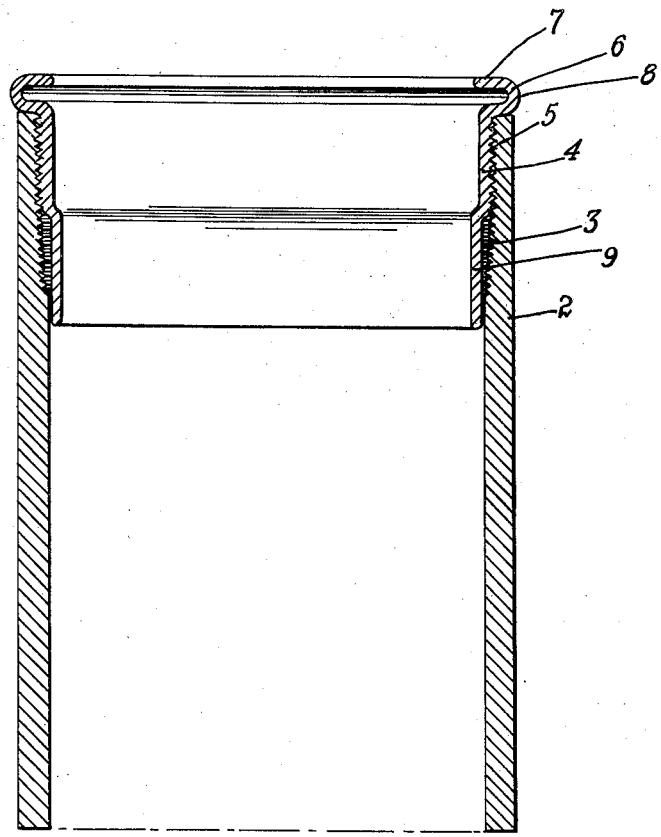
INVENTOR.
Peter J. Shrum
BY Green and McAlister
His ATTORNEYS.

Patented June 26, 1928.

1,675,143

UNITED STATES PATENT OFFICE.

PETER J. SHRUM, OF MONACA, PENNSYLVANIA, ASSIGNOR TO COLONA MANUFACTURING COMPANY, OF PITTSBURGH, PENNSYLVANIA, A CORPORATION OF PENNSYLVANIA.

THREAD PROTECTOR.

Original application filed April 22, 1924, Serial No. 708,204. Divided and this application filed August 15, 1927. Serial No. 212,981.

My present invention relates to internal thread protectors and is a division of an application filed by me on April 22nd, 1924 and serially numbered 708,204.

It is customary in shipping internally threaded pipe, since the most vulnerable portions thereof are the ends, to protect these from injury by screwing a thread protector into each pipe end. The protector not only stiffens the pipe ends but also protects the internal threads from damage and dirt.

One object of this invention is to provide an improved thread protector for use with internally threaded pipe and couplings which is so constructed as to offer special protection to the extreme end portions of the couplings or pipe upon which they are used.

In the drawings, the single view illustrates in section a protector embodying this invention applied to a pipe end having internal tapered threads.

In the construction shown, 2 represents the end portion of a pipe having tapered threads 3 cut therein. The protector is formed from a section of tubing in such manner as to provide a body portion 4 which is tapered and provided with screw threads 5 adapted to mesh with the threads 3 of the pipe end.

The large end of the protector terminates in a double walled annular flange made up of an outwardly extending flange portion 6, an inwardly extending annular lip 7 which is spaced from the flange and overlies the same and a curved wall 8 which connects the flange and lip.

The small end of the body 4 terminates in an un-threaded skirt portion 9 which is of less external diameter than the external diameter of the smallest part of the threaded body and of less external diameter than the internal diameter of the un-threaded portion of the pipe.

The annular wall 6 which is curved outwardly projects beyond the outer surface of the pipe and thus forms most effective protection for the extreme end of the pipe to which the protector is applied. As shown in the drawings the skirt 9 covers a portion of the perfect threads as well as the vanishing threads of the pipe and aids in placing the device in protecting position.

Having thus described my invention, what I claim as new and desire to secure by Letters Patent is:

1. A one piece thread protector comprising a tapered body open at both ends, an outwardly projecting annular flange at the large end of the body, an inwardly projecting annular lip spaced from said flange and overlying the same, screw threads formed in the outer surface of the body and an unthreaded extension for the small end of the body of less external diameter than the diameter of the smallest threaded portion of the body.

2. In a thread protector, a tapered body open at both ends, an outwardly projecting annular flange at the large end of the body, an inwardly projecting annular lip spaced from said flange and overlying the same and connected thereto by a curved wall, screw threads formed in the outer surface of the body and an unthreaded extension for the small end of the body of less external diameter than the diameter of the smallest threaded portion of the body, said protector being formed from a section of tubing.

3. In a thread protector, a tapered body open a both ends, an outwardly projecting annular flange at the large end of the body, an inwardly projecting annular lip spaced from said flange, overlying the same and connected thereto by a curved wall, screw threads formed in the outer surface of the body and an unthreaded extension for the small end of the body of less external diameter than the diameter of the smallest threaded portion of the body, said curved wall being adapted to project beyond the outer surface of the article to be protected.

4. A thread protector comprising a tapered body portion open at both ends and having an outwardly extending double-walled annular flange at one end and unthreaded skirt at the other end, said skirt being of less diameter than the internal diameter of the threaded portion of the article to be protected.

In testimony whereof, I have hereunto subscribed my name this 12th day of August, 1927.

PETER J. SHRUM.